3,348,922
CARBON DIOXIDE GENERATOR
Robert N. Bose and William I. Tibbitts, St. Joseph, and Rolf I. Ranum, Benton Harbor, Mich., assignors to Whirlpool Corporation, a corporation of Delaware
Filed July 13, 1964, Ser. No. 382,148
9 Claims. (Cl. 23—281)

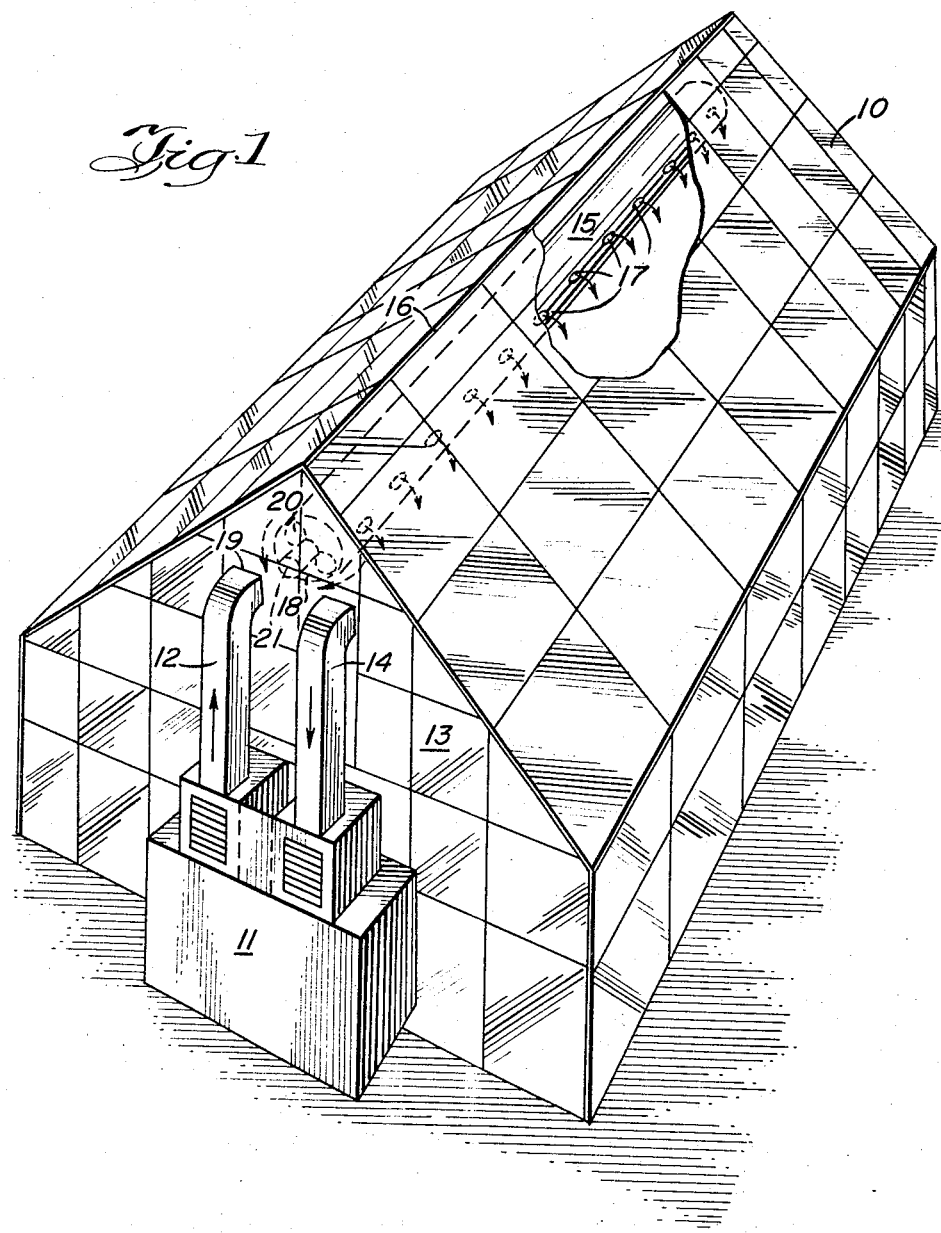

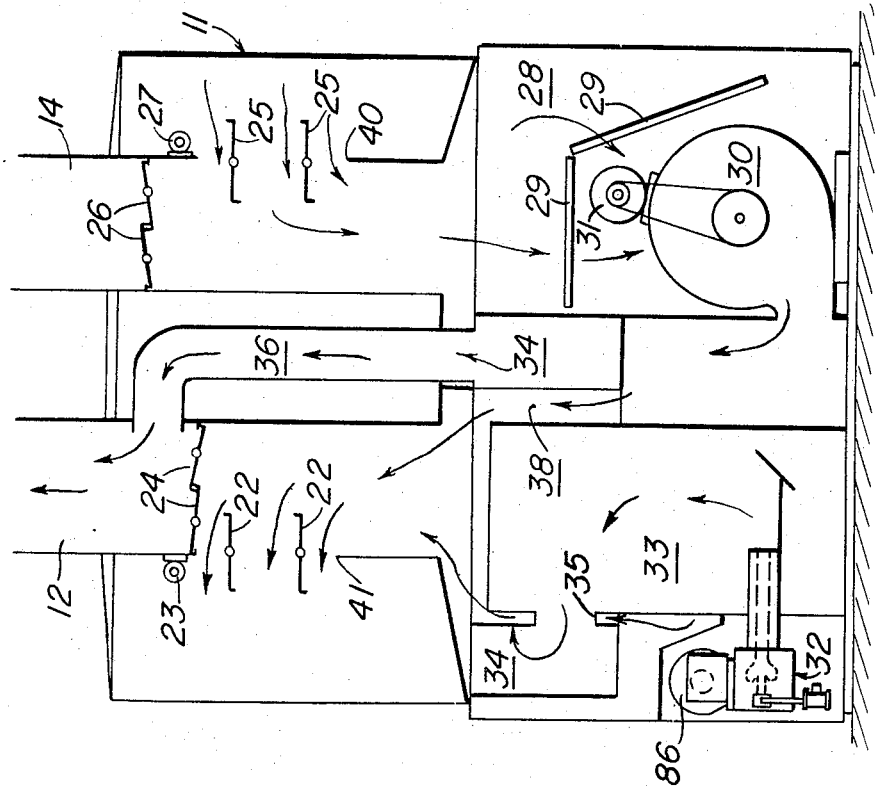
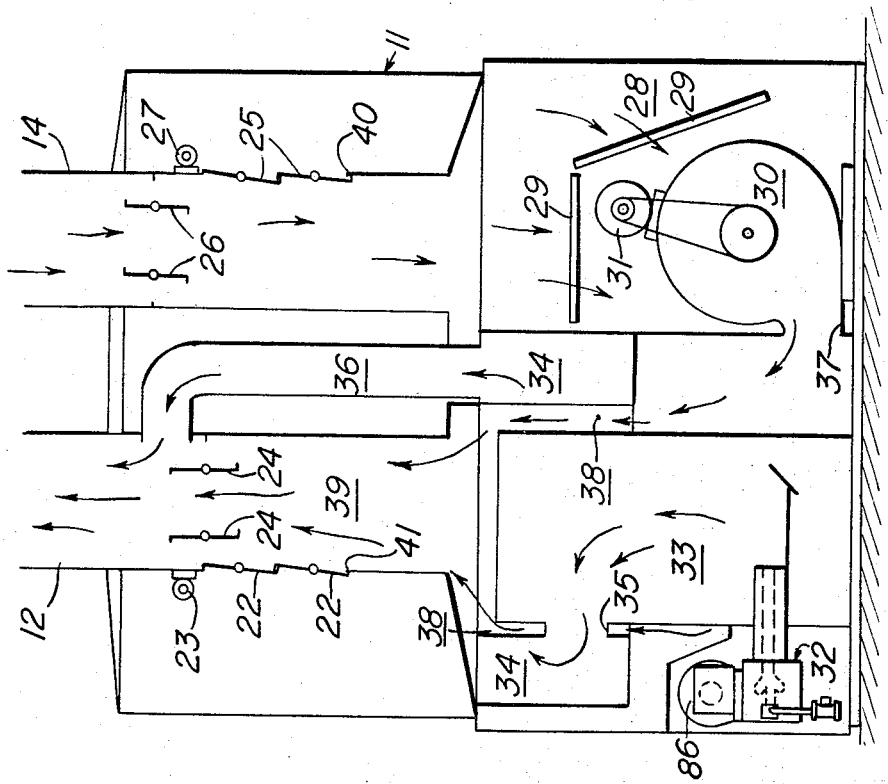

This invention relates to an apparatus for providing carbon dioxide rich gas to the atmosphere in an enclosure such as a greenhouse.

It has long been known that the growth of plants can be stimulated by subjecting them to an atmosphere containing larger amounts of carbon dioxide than found in ordinary air. This invention provides an apparatus for producing carbon dioxide rich gas for an enclosure and also for controlling the temperature of the gases going into the enclosure.

One of the features of this invention is to provide an improved apparatus for producing carbon dioxide gas for an enclosure such as a greenhouse and for simultaneously controlling the temperature within the enclosure by temperature control of the gas entering the enclosure.

Other features and advantages of the invention will be apparent from the following description of one embodiment of the invention as illustrated in the accompanying drawings. Of the drawings:

FIGURE 1 is a perspective view partially broken away of a greenhouse having a carbon dioxide generator and a gas distributor associated therewith.

FIGURE 2 is a semi-diagrammatic view of a generator for carbon dioxide rich gas.

FIGURE 3 is a view similar to FIGURE 2 but with various controls therein set in different positions as hereinafter described in detail.

Figure 4:
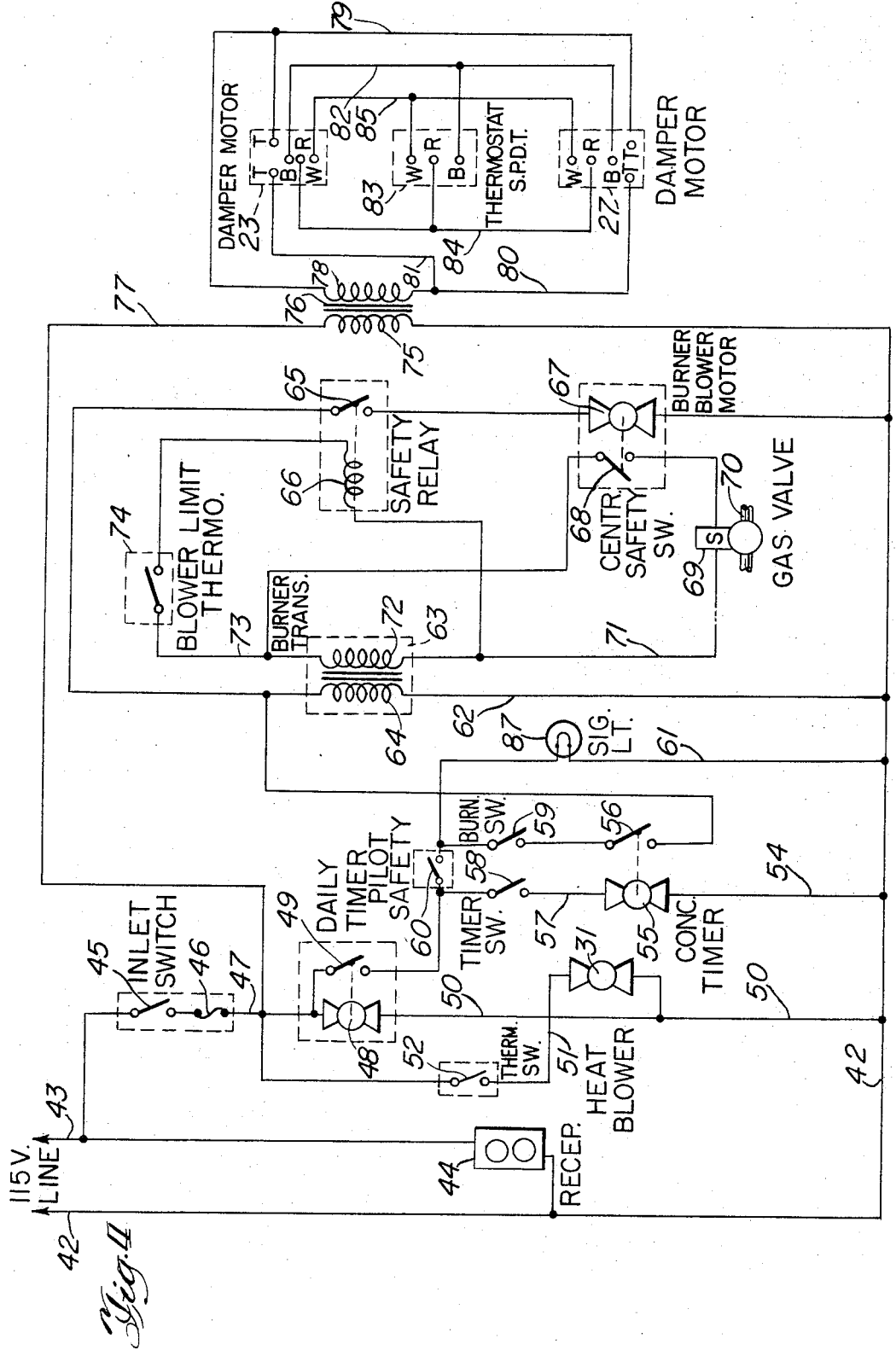
FIGURE 4 is a wiring diagram for the generator of FIGURES 2 and 3.

In the embodiment shown in the accompanying drawings there is provided a greenhouse 10 at one end of which is positioned a generator 11 for providing temperature controlled carbon dioxide rich gas. The generator 11 has an outlet conduit 12 extending through an end wall 13 of the greenhouse for conveying gas to the interior and an inlet conduit 14 also adjacent the wall 13 for conveying atmosphere from within the greenhouse 10 to the generator 11.

In order to aid in circulating the atmosphere within the greenhouse 10 including the carbon dioxide rich gas from the conduit 12, there is provided a gas distributing duct 15 extending beneath the ridge 16 of the greenhouse and containing spaced openings 17 from which gas within the duct 15 flows outwardly into the interior of the greenhouse.

The duct 15 has an inlet 18 spaced from but aligned with the exhaust end 19 of the generator outlet conduit 12. Within the inlet 18 is a blower 20 operated by an electric motor 21 to blow gas through the duct 15. With this arrangement the blower 20 draws gas from the conduit 12 and also from the interior of the generator and circulates it by way of the duct 15 and the openings 17.

The generator 11 as shown in FIGURES 2 and 3 has a pair of dampers 22 in a side wall of the conduit 12 that are opened and closed by means of an electric motor 23. Within the conduit 12 are positioned a pair of dampers 24 also operated by the motor 23 that in one position, as shown in FIGURE 2, are aligned with the direction of flow in order to provide free flow through the conduit 12, while in another position, as shown in FIGURE 3, are arranged across the conduit 12.

The inlet conduit 14 to the generator 11 is also provided with a pair of dampers 25 similar to the dampers 22 and a pair of dampers 26 similar to the dampers 24. These dampers 25 and 26 are operated by an electric motor 27 similar to the motor 23.

The bottom of the generator 11 is provided with a side compartment 28 in which are located a pair of filters 29 and a blower 30 operated by a motor 31.

The bottom of the generator opposite the compartment 28 is provided with a gas burner 32 of customary construction adapted to burn a hydrocarbon gas in the presence of air in a combustion chamber 33. The combustion chamber 33 exhausts adjacent its top into an annular heat exchanger 34 which extends around but is spaced from the top of the combustion chamber 33. The gases from the combustion chamber exhaust through an outlet 35 into the heat exchanger 34. From the heat exchanger 34 on the side opposite the outlet 35 the carbon dioxide rich combustion gases flow upwardly in a flue 36 into the outlet conduit 12 at a point above the dampers 22 anl 24.

The blower 30 exhausts by way of a bottom outlet 37 to the space around the combustion chamber 33 and upwardly in a passage 38 between the heat exchanger 34 and the top of the combustion chamber 33. The air is then directed into the plenum chamber 39 which is between the top of the combustion chamber 33 and the area where the flue 36 joins the outlet conduit 12.

With the dampers 22, 24, 25 and 26 arranged in the positions shown in FIGURE 2 atmosphere from within the greenhouse 10 is drawn through the inlet conduit 14, through the filters 29, into the blower 30, past the heat exchanger 34 and into the chamber 39 and from there to the greenhouse by way of the conduit 12. The carbon dioxide rich gases formed by the combustion in the combustion chamber 33 pass directly into the heat exchanger 34 and from there into the conduit 12 by way of the flue 36 where they are mixed with the cooling air.

With the dampers arranged as above described in FIGURE 2 the cooling air is mingled with the combustion products to provide heat to the freenhouse during cold periods such as the winter season.

When it is desired to supply cool carbon dioxide rich gas to the greenhouse such as during the summer or when bright sunshine raises the interior temperature to an undesirable point the motors 23 and 27 are energized to turn the dampers to their positions shown in FIGURE 3. This is the preferred arrangement of the apparatus. Here the motor 23 has turned the dampers 24 to block cooling air access to the conduit 12 and the dampers 22 have been turned to exhaust this heated cooling air into ambient air. Similarly, the dampers 26 have been turned to positions blocking the inlet conduit 14 while the dampers 25 have been turned to permit ambient air to be drawn into the generator by the blower 30. This air after being drawn in from the outside by way of the opening 40 exposed by turning the dampers 25 is then drawn into the blower 30 and then exhausted around the combustion chamber 33, up the passage 38 in the heat exchanger 34 and finally exhausted back to the atmosphere through the opening 41.

As can be seen from the above description the cooling is done by gaseous component of the atmosphere within the greenhouse. Thus, in the FIGURE 2 arrangement a portion of the atmosphere within the greenhouse itself is drawn through the conduit 14 and then forced back into the greenhouse through the conduit 12. In the arrangement of FIGURE 3 the gaseous component is air which of course is the major gaseous item within the greenhouse. However, this air is drawn from ambient air and is then exhausted back into the ambient. Thus, in the FIGURE 2 arrangement the gaseous component is from the greenhouse or enclosure while in the FIG- URE 3 arrangement the gaseous somponent is drawn from outside and is not exhausted into the greenhouse. This arrangement is important in that if desired the dampers 22 and 24 may be turned to the positions shown in FIGURE 2 so that the air is exhausted into the greenhouse even though it is drawn from the ambient atmosphere.

The duct and blower arrangement shown in FIGURE 1 is important not only in circulating and mixing carbon dioxide rich gas within the greenhouse but is also important as giving better air circulation so that more uniform temperatures, humidity and carbon dioxide conditions are maintained throughout the greenhouse. These are very important in helping control plant diseases such as Botrytis, stem rot and other fungus diseases.

Another advantage of the system disclosed herein is that even when the burner is not operating the blower 30 can be used to draw in cool outside air as shown in FIGURE 3 which can then be exhausted into the greenhouse through the conduit 12 by way of the open dampers 24 as shown in FIGURE 2. This provides not only temperature control on warm summer days but itself increases the carbon dioxide content within the greenhouse. Thus, this arrangement will increase the carbon dioxide content from a normal low of 100–150 p.p.m. to about 200–250 p.p.m. In addition, of course, the generator-blower 30 and diffuser system as described can be used to distribute other plant treating materials in addition to the carbon dioxide to the plants wihin the greenhouse.

A wiring diagram is disclosed in FIGURE 4 wherein the components are powered from parallel 115 volt lines 42 and 43.

Across the lines 42 and 43 is a 115 volt receptacle 44. Connected to the line 43 is an inlet switch 45 in series with a fuse 46. From the fuse 46 a line 47 leads to a timer motor 48 arranged to open and close a daily timer switch 49.

From the other side of the motor 48 a line 50 leads to the power line 42. To this line 50 is connected one side of the motor 31 for the blower 30. The other side of this motor is connected by line 51 to a thermostatic switch 52. This switch is adapted to energize the motor 31 when the switch is closed. The other side of the switch 52 is connected to the line 47.

The power line 42 is also connected to a line 54 to one side of a concentration timer motor that is adapted to open and close a switch 56. The other side of the motor 55 is connected by line 57 to a timer switch 58 which is a manually operated toggle switch. The switch 56 operated by the timer 55 is connected to the manually operated toggle burner switch 59 that is also connected to the daily timer switch 49 by way of a pilot safety switch 60 which remains closed as long as the pilot flame is burning.

Connected to the power line 42 is a line 61 containing a signal light 87 with the other end of the line 61 being connected to one side of the pilot safety switch 60.

Connected to the power line 42 is a line 62 leading to one side of a burner transformer 63. This one coil 64 of the transformer is connected to a safety relay switch 65 that is operated by a solenoid 66. The other side of the spitch 65 is connected to one side of a blower motor 67 for operating the burner while the other side of this motor is connected to the power line 42. The burner blower motor 67 is provided with a centrifugally operated safety switch 68 that is arranged to close at a predetermined speed of the motor 67 to energize a solenoid gas valve 69 and open the gas line 70 to the burner 32. The solenoid 69 is connected by a line 71 to one side of a coil 72 of the transformer 63. The other side of this coil is connected by line 73 to one side of a fan limit thermostat 74. The other side of this thermostat 74 is connected to the solenoid 66.

The power line 42 is connected to one coil 75 of a damper transformer 76. The other side of this coil 75 is connected by line 77 to the other power line 43 by way of the inlet switch 45 and fuse 46.

The second coil 78 of the transformer 76 is connected ot one of the two T terminals on each of the damper motors 23 and 27 by way of a line 79. The other side of this coil 78 is connected by lines 80 and 81 to the other T terminal of the damper motors 23 and 27. The B terminals of the two motors are connected by a line 82 which is connected to the B terminal of the single pole double throw thermostat switch 83. The two motors 23 and 27 also have R terminals which are connected by a line 84 that is in turn connected to the R terminal of the switch 83. The two motors likewise have W terminals which are connected by a line 85 also connected to the corresponding terminal on the thermostat switch 83. In the embodiment illustrated the damper transformer 76 converts the 115 volts of the supply to 24 volts for operating the damper motors.

The greenhouse thermostat 83 is set for a predetermined temperature in the greenhouse atmosphere. When this predetermined temperature is exceeded the thermostat 83 energizes the damper motors 23 and 27 to turn the dampers to the positions shown in FIGURE 3 to bring in outside air for cooling purposes.

The fan limit thermostat switch 74 is arranged to sense the temperature of the combustion gases from the burner 32. If the temperature of these gases exceeds a preset value it is indicative that the blower 30 is malfunctioning. When this occurs the normally closed blower limit switch 74 opens to block the circuit to the solenoid 66. This permits switch 65 to open, as shown in FIGURE 4, and de-energizes the burner blower motor 67. As the motor comes to a halt the centrifugal safety switch 68 opens to de-energize the solenoid valve 69 and shut the gas lines 70 to the burner 32.

The manually adjustable daily timer switch 49 is normally set to close the switch by operation of the motor 48 and to keep the switch 49 closed between sunrise and sunset. The closing of this daily timer switch 49 conditions the circuit to the concentration timer switch 56 which is a manually adjustable toggle switch and controls the on-off time of the carbon dioxide generator. The concentration timer switch 56 which is operated by the motor 55 is set by trial and error to supply the needed amount of carbon dioxide in the enclosure.

Both timer switch 58 and burner switch 59 are manually operated toggle spitches that are used for servicing the greenhouse generator. These switches 58 and 59 are so located in the circuit that the generator may be shut off as for servicing without interrupting power to the daily timer 49.

The concentration timer motor 55 is used to control the concentration of carbon dioxide entering the greenhouse. Thus, if the normal carbon dioxide content in the combustion chamber 33 is above that required in the greenhouse, the timer motor 55 may be set to permit operation of the burner for those times that are required to maintain the desired concentration. The timer motor 55 operates the switch 56 to open it at the end of the predetermined time to de-energize the burner transformer 63 and de-energize the solenoid 66 to permit the switch 65 to open with the results previously described.

Thermostat switch 52 which controls the blower motor 31 is arranged to receive heat from the combustion chamber 33. This switch 52 remains open as shown in FIGURE 4 until the temperature within the combustion chamber 33 reaches a preset value. It is not until this preset temperautre is achieved that the switch 52 closes to energize the motor 31 operating the blower 30.

Having described our invention as related to the embodiment shown in the accompanying drawings, it is our intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. Apparatus for providing carbon dioxide rich gas to the atmosphere in a chamber, comprising: an enclosure; a burner in said enclosure for burning hydrocarbon fuel in the presence of air to provide said gas in a heated condition; first conduit means in said enclosure for flowing said gas from said burner into said chamber; second conduit means in said enclosure for flowing a gaseous component of said chamber atmosphere in heat exchange relationship with said heated gas prior to said gas entering said chamber; and movable valve means in said second conduit means for directing said component subsequent to said heat exchange flow selectively to said chamber or to a place of disposal to regulate the temperature in said chamber.

2. The apparatus of claim 1 wherein said means for flowing a gaseous component comprises means for passing ambient air in said heat exchange relationship.

3. The apparatus of claim 1 wherein said means for flowing a gaseous component comprises means for withdrawing atmosphere from said enclosure and passing said withdrawn atmosphere in said heat exchange relationship.

4. The apparatus of claim 1 wherein said atmosphere in said chamber is primarily air and said gaseous component is air, and there are provided a heat exchanger in said enclosure having said second conduit means in heat exchange relationship with said first conduit means, the second conduit means having an inlet and an outlet, movable first valve means in said second conduit means for selectively flowing either ambient air or enclosure atmosphere through said second conduit means by way of said inlet, and movable second valve means in said second conduit means for selectively flowing said ambient air or enclosure atmosphere from said heat exchanger outlet to a place of disposal or to said enclosure.

5. The apparatus of claim 4 wherein said first conduit means has an exit in said chamber, and there are provided gas distributing duct means in said chamber having an entrance spaced from and substantially aligned with said conduit means exit to receive simultaneously carbon dioxide rich gas from said exit and atmosphere from said enclosure by way of the space between said conduit means outlet and said duct means entrance.

6. The apparatus of claim 5 wherein said duct means is provided with spaced gas outlet means.

7. Apparatus for providing an atmosphere comprising carbon dioxide and air in a chamber, comprising: an enclosure; a burner in said enclosure for burning hydrocarbon fuel in the presence of air to provide a gas rich in carbon dioxide; gas conduit means in said enclosure from said burner to said chamber for conveying said gas to said chamber; air conduit means in said enclosure having an entrance from ambient air, a heat exchange section in heat exchange relationship with said gas conduit means, and a first exit means to ambient air and a second exit means to said chamber, both said exit means being located subsequent to said heat exchange section; atmosphere conduit means in said enclosure from said chamber to said air conduit means; first movable valve means in said air conduit means entrance; means for opening and closing said first valve means; second movable valve means in said air conduit means first exit means; means for opening and closing said second valve means; third movable valve means in said air conduit means second exit means; means for opening and closing said third valve means; fourth movable valve means in said atmosphere conduit means; and means for opening and closing said fourth valve means.

8. The apparatus of claim 7 wherein filter means are provided in said air conduit means prior to said heat exchange section.

9. The apparatus of claim 7 wherein said means for opening and closing said first, second, third and fourth valve means comprises means for opening said first valve means and simultaneously closing said fourth valve means, and vice versa, and for opening said second valve means and simultaneously closing said third valve means, and vice versa.

References Cited
UNITED STATES PATENTS

| | | | |
|---|---|---|---|
| 2,725,673 | 12/1955 | Perin | 47—1.2 |
| 2,787,530 | 4/1957 | Staiger | 23—281 |
| 3,203,771 | 8/1965 | Brown et al. | 23—281 |

JAMES H. TAYMAN, Jr., *Primary Examiner.*

MORRIS O. WOLK, *Examiner.*